(12) United States Patent
Sunkara et al.

(10) Patent No.: US 12,400,659 B1
(45) Date of Patent: Aug. 26, 2025

(54) INFUSING KNOWLEDGE GRAPHS INTO AUTOMATIC SPEECH RECOGNITION

(71) Applicant: Amazon Technologies, Inc., Seattle, WA (US)

(72) Inventors: Monica Lakshmi Sunkara, San Jose, CA (US); Nilaksh Das, Seattle, WA (US); Sravan Babu Bodapati, Redmond, WA (US); Katrin Kirchhoff, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 254 days.

(21) Appl. No.: 18/074,420

(22) Filed: Dec. 2, 2022

(51) Int. Cl.
*G10L 15/26* (2006.01)
*G06F 40/295* (2020.01)

(52) U.S. Cl.
CPC ............ *G10L 15/26* (2013.01); *G06F 40/295* (2020.01)

(58) Field of Classification Search
None
See application file for complete search history.

(56) References Cited

U.S. PATENT DOCUMENTS

| | | | | |
|---|---|---|---|---|
| 11,508,392 | B1* | 11/2022 | Sohail | G10L 15/197 |
| 11,620,311 | B1* | 4/2023 | Kumar | G06F 16/283 |
| | | | | 707/602 |
| 12,198,681 | B1* | 1/2025 | Sunkara | G10L 15/16 |
| 2003/0191625 | A1* | 10/2003 | Gorin | G06F 40/295 |
| | | | | 704/E15.022 |
| 2013/0246049 | A1* | 9/2013 | Mirhaji | G06F 40/284 |
| | | | | 704/9 |
| 2018/0068661 | A1* | 3/2018 | Printz | G10L 15/1815 |
| 2021/0012068 | A1* | 1/2021 | Coppersmith | G06Q 10/0639 |
| 2021/0319066 | A1* | 10/2021 | Boxwell | G06F 40/131 |
| 2022/0292160 | A1* | 9/2022 | Mehta | G06F 16/972 |
| 2022/0335947 | A1* | 10/2022 | Li | G10L 15/26 |
| 2023/0081306 | A1* | 3/2023 | Kuo | G06N 3/09 |
| | | | | 704/200 |
| 2023/0197064 | A1* | 6/2023 | Bekker | G10L 15/26 |
| | | | | 704/200 |

* cited by examiner

*Primary Examiner* — Neeraj Sharma
(74) *Attorney, Agent, or Firm* — Davis Wright Tremaine LLP (57) ABSTRACT

Systems and methods are described for converting speech to text. In one aspect, a method for converting speech to text includes generating an initial transcript of an audio or video file. At least one named entity may be extracted from the initial transcript using entity recognition. A subset of nodes of a knowledge graph that include the at least one named entity may be selected, where the subset of nodes of the knowledge graph correspond to a set of named entities. The method may further include encoding the set of named entities to generate a set of entity embeddings. The speech in the audio or video file may then be decoded using the set of entity embeddings to produce a final transcript of the audio file.

18 Claims, 7 Drawing Sheets

INFUSING KNOWLEDGE GRAPHS INTO AUTOMATIC SPEECH RECOGNITION

BACKGROUND

Automatic speech recognition (ASR) is an expanding field that is gaining traction in many different aspects of human life, including business engagements, voice control of various computing devices, including smart phone, home, security, and other systems, medical scenarios, and call centers, to name a few examples. These ASR systems have historically relied on custom vocabularies to fine tune the ASR for specific domains. Knowledge Graphs (KG) have lot of domain specific entities data, and their relation to other entities available for use. KGs are considered as efficient form of knowledge representation that captures the semantics of entities and their relations for a domain. Domain-specific speech can contain distinct named entities which are critical to the domain. For example, medical domain speech can contain entities such as medication, drugs, disease names. However, the domain specific nouns or names may often be mis-transcribed by ASR systems due to the long-tail distribution of such terms in training data (e.g., low likelihood that these words will be spoken or choses). Many current ASR systems utilize single base ASR model for all scenarios and domains and require domain specific tuning using additional features on top of the base model, such as custom vocabulary. This requires a user or customer to manually providing domain specific vocabulary as a list or text data.

BRIEF DESCRIPTION OF THE DRAWINGS

Various techniques will be described with reference to the drawings, in which.

DETAILED DESCRIPTION

Systems and methods are described herein for infusing knowledge graphs (KGs) into automatic speech recognition (ASR). In some aspects, techniques for performing automatic speech recognition, in converting speech to text may use domain specific knowledge graphs to improve accuracy of and interface with existing ASR processes without requiring users to define custom vocabularies for domain specific speech. In some aspects, a method for infusing knowledge graphs into speech to text conversion may include generate an initial transcript of the audio file by decoding the audio file. At least one named entity, such as a recognized word or phrase, may be identified from the initial transcript by performing named entity recognition. Next at least a portion of a domain specific knowledge graph (e.g., one or more subgraphs), may be determined using the at least one named entity. The domain specific knowledge graph may include a plurality of nodes indicating a plurality of named entities that include the at least one named entity, where at least some of the of nodes are connected by edges indicating relationships between the respective plurality of nodes. In some cases, the nodes in the subgraph may be selected based on a distance (e.g., how many hops or edges) the nodes are from a node representing a named entity. In some cases, the named entities corresponding to the node sin the identified subgraph may further be filtered, such as using fuzzy machining or other techniques. In some cases, the filtering may include selecting nodes of the subgraph that have a matching score of greater than a threshold to a named entity identified in the initial transcript.

The resulting set of nodes/named entities may then be encoded, such as using a knowledge contextualized encoder to generate a set of entity embeddings. The entity embeddings may then be used by a second pass or fusion decoder to decode the original audio, using the domain specific knowledge, to ultimately produce a more accurate final transcript of the original audio. In some examples, generating the set of entity embeddings may also use as inputs, various sources of lexical information/using a lexical encoder or a sequence encoder that is trained sing lexical information.

In some aspects, integrating KGs into the ASR recognition enables accurate ASR without any terminology being provided by the customer, for example, with identification of a domain the customer is operating in. Some implementations utilize a two-pass approach to infuse such domain-specific knowledge graphs to neural ASR models to provide domain-specific speech models to customers without updating the underlying base ASR model. The described solution can provide a cost-efficient domain-specific speech model to customers without the additional overhead, effort, or cost of data collection needed to develop custom libraries/vocabulary. The described techniques may provide more robust and accurate speech recognition than existing systems utilizing custom vocabulary, as the existing systems do not weight the probability of the domain specific vocabulary such that it is likely to be produced by the models. The described techniques may also be beneficial over existing system, as the described techniques may not have a size limit on vocabulary. The described techniques learns, using various machine learning techniques, to auto-select a subgraph of relevant vocabulary/entities from the domain-specific knowledge graph for each audio, thereby overcoming the limitation on size of input vocabulary, making a highly scalable solution.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) providing more accurate automatic speech recognition/speech to text functionality; 2) providing more accurate automatic speech recognition/speech to text functionality while requiring less data storage volume to house custom vocabularies; 3) reducing computing resource/network bandwidth usage by providing more accurate speech to text services, thus reducing computing resource usage to disambiguate the resulting text, and (4) other advantages as will be made apparent in the rest of this disclosure.

Figure 1:
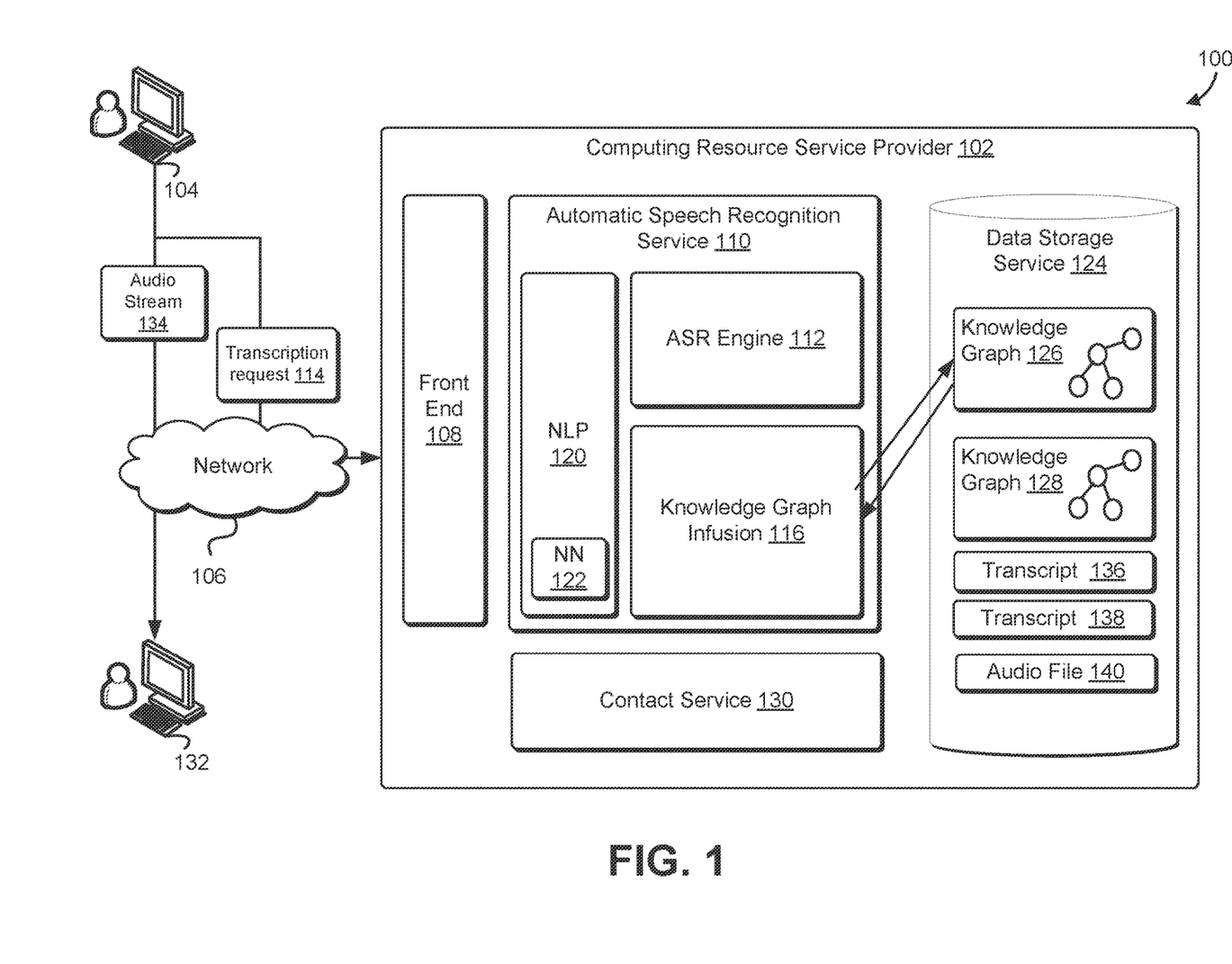
FIG. 1 illustrates an example environment in which the described techniques can be practiced, according to at least one embodiment.

FIG. 1 illustrates an example environment 100 in which an automatic speech recognition (ASR) service 110 may be provided by a computing resource service provider 102. ASR service 110 may interact with various other computer-implemented services, such as one or more of a front end 108, a contact service 130, and/or a data storage service 124 to provide for speech recognition and transcription generation functionality, as will be described in greater detail below. Various client computing devices 104, 132 may interact with each other and/or the computing resource service provider 102 through one or more networks 106 to access this functionality.

Client 104, 132 may refer to a client computer system or computing device connected to a server (e.g., computing resource service provider) over a network 106. In some cases, client 104 refers to a user or operator of a client computer system, and may be an employee of an organization that utilizes a computing resource service provider 102 to interact with various forms of data, such as through one or more of an ASR service 110, front end 108, contact service 130 and/or data storage service 124.

In some aspects two or more client devices 104, 132 may communicate with each other, such as via one or more audio, text, or video-based communication channels, such as using voice over internet protocol, cellular, audio and/or video interfaces to generate an audio stream 134 of interactions between the computing devices 104, 132. In some cases, the audio stream may be generated and/or received by the computing resource service provider 102 in real time. In other cases, the audio stream 134 may be recorded audio data that may have been recorded at a previous time. In some cases, one of computing devices 104, 132 may be associated with the computing resource service provider 102, such as may be provided by or through a contact service 130 or other computerized service. In these cases, the computing device 132 may be operated by a human operator or user, such as may be referred to generally as an agent. In other aspects, the agent may be fully automated, including textual and audio communications (e.g., a bot).

In some cases, the front end 108 may receive either a request for a transcript 114 or the audio stream 134, such as in cases where a contact service 130 is utilized or when the transcription request 114 comprises a real time transcription request during a call or video and direct it to the appropriate service. The front end 108 may be a system including a set of web servers (e.g., a single web server or a set of web servers which may be managed by a load balancer) provided by the computing resource service provider 102. Web servers of the front end 108 may be configured to receive various requests and data and to process them according to one or more policies associated with the service. In some examples, client 104, 132 uses client software that is configured to establish a client-server relationship with a service of a computing resource service provider 102. A client 104, 132 may connect to a service via front end 108, which receives requests from clients and routes them to backend services. Front end 108 may interface with one or more of ASR service 110, a contact service 130, and/or a data storage service 124, and/or other services offered by a computing resource service provider 102 to its customers. In at least one embodiment, client 104, 132 interacts with a GUI to interact with various data provided by or through the computing resource service provider 102, and client-side software translates the GUI setup to a web service API request which is transmitted from the client computer system 104, 132 to front end 108 via a network 106. In an embodiment, the network 106 includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network 106 is enabled by wired and/or wireless connections and combinations thereof. In some cases, a network may include or refer specifically to a telephone network such as a public switched telephone network or plain old telephone service (POTS).

The computing resource service provider 102 may provide various services such as data processing, data storage, software applications, security, encryption, and/or other such services. A computing resource service provider 102 described herein may be implemented using techniques described below in reference to FIG. 7. The computing resource service provider 102 may provide services that may be accessible through various software, hardware, and/or variations thereof. In some examples, the services may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other various capable computing systems.

In some examples, the computing resource service provider 102 may provide data storage through a data storage service 124 to store and manage large volumes of data, including text, image, and other data. The data storage service 124 may store various data, such as may be organized into customer or account data, in the form of various transcripts 136, 138 generated by the ASR service 110. Customer data may include one or more versions of various customer data, such as may pertain to an account, order, or other logical construct associated with a user of the computing resource service provider 102. In some cases, the data storage service 124 may also store or have access to one or more knowledge graphs 126,128 such as may be collections of entities (e.g., a label, noun, etc.) linked to one or more other entities via an edge, which may signify some type of relationship between the connected entities (e.g., entity 1 is a class or type of entity 2, and so on).

In some cases, each knowledge graph 126, 128 may be domain specific, such that it is associated with a keyword or topic, and may be specifically accessed by the ASR service 110 to disambiguate terms pertaining to the specific domain (e.g., medical field, computing technology, interior design, and so on including any known or arbitrary groupings of connected or related words, phrases, etc.). In some cases, the user may provide a domain for use by the ASR service 110 in translating or transcribing speech. In other cases, the ASR service 110 may identify a specific domain based on the detection and comparison of one or more words or phrases within the speech itself, that many be already associated with a specific domain. In yet other cases, the contact service 130 may identify and/or communicate an indication of a domain of a given audio or video file or audio stream, for example, based on one or more domains the contact service 130 is associated with. In yet some cases, one or more domains may be associated with a specific user or group of users, such that when that user is associated with a given audio or video file or audio stream, the associated domain may be selected or weighted to a greater extent in a domain selection process. For example, an example user may be a contact service agent. The agent may be associated with a domain specific to an industry, such as medical services. In this case, upon determining that the audio file is originating from the user, or is otherwise associated with the user, a medical service domain or domains may be selected, or alternatively, weighted in a selection process, such that this domain would be more likely to be chosen when the user is associated with the audio to be converted. In yet other cases, a knowledge graph itself could contain link different users with each other and with specific domains, such that when two users are identified the knowledge graph can be searched to determine if they share any domains, whereby if one or more domains are identified, these may be auto selected of weighted in a selection process.

Data storage service 124 may be an on-demand data storage service, such as an object-based data storage service that services API requests to store and retrieve data objects synchronously, and may be configured to store various forms of data and media, including knowledge graphs 126, 128, transcripts 136, 138, various audio files or audio streams or recordings 140, and various other data, such as various machine learning models and/or neural networks utilized by the ASR service 110.

The data storage service 124 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein. In some examples, data stored in the data storage service 124, may be organized into data objects, in one or more logical data containers. The data storage service 124 may include one or more data objects, which may have arbitrary sizes and may, in some instances, have constraints on size. Thus, the data storage service 124 may store numerous data objects of varying sizes. The data storage service 124 may operate as a key value store that associates data objects with identifiers of the data objects which may be used by ASR service 110, contact service 130, and/or the other services to retrieve or perform other operations in connection with the data objects stored by the data storage service 124. Access to the object-based data storage service 124 may be through application programming interface (API) calls to the service or via an interface, such as a graphical user interface (GUI). Access to the data storage service 124 may be through application programming interface (API) calls to the service, for example from client device 104, 132 directly or through the computing resource service provider 202 and/or front end 208.

It should be appreciated that the data storage service 124 may additionally or alternatively provide non-object based data storage, such as block data storage, table-oriented data storage, relational databases, file-based storage, and the like. The data storage service 124 may also implement an archival system or process that stores certain data objects in different storage locations, devices, etc., for example, based on access to those data objects or other factors. For example, some data objects that have not been accessed for a certain period of time may be moved from a storage device or location (e.g., referred to herein generally as storage class) that provides prompt access, albeit at increased cost, to a more cost effective storage class that may provide access with some delay, different redundancy, or other attributes.

The computing resource service provider 202 may also provide a contact service 130. The contact service 130 may be a collection of computing resources, including physical resources, virtual resources, or combinations thereof, configured to obtain, direct, and otherwise manage various communications streams from or between various computing devices, such as audio stream 134 between computing devices 104, 132. In some examples, the contact service 130 may provide automated or partially automated communications to computing devices, such as text or audio communications, to one or more computing devices 104, 132. In some cases, contact service 130 may facilitate establishing and managing communication channels between various computing devices 104, 132. In some cases, the contact service 130 may provide omnichannel communications. For example, text messaging or chat, voice contact, and/or video contact may be dynamically offered, based on such factors as customer preference and estimated wait times. The contact service 130, in some aspects, can integrate with one or more other services, to provide managed communication channels to users of the one or more services. The contact service 130 may provide for a wide range of communication services to a variety of computing devices. In some examples, the contact service 130 may operate as a call center, such as for one or more web-based businesses, retailers, etc. In other cases, the contact service 130 may provide communication services to any number of different organizations, such as health related organizations, retail, construction, legal services, etc. It should be appreciated that the techniques described herein have a broad range of applications, and that the above-mentioned use cases are only given by way of example.

In some aspects, the contact service may include one or more control interfaces. The control interface may provide a GUI to a computing device or agent associated with the contact service 130, to aid in establishing and managing communication channels with client computing devices. In some cases, the control interface may provide a dashboard to facilitate managing various communication channels, various contact flows, and/or various queues. A contact flow may encompass one or more menu options and routing directions (e.g., automated routing instructions) to respond to a customer inquiry, such as may be received from a computing device 104, 132, in the form of a text or audio stream, such as audio stream 134. A contact flow may be contained in a data structure, which is processed when a communication channel is established, and may include different routing instructions, pointers to different audio recordings, text responses, and the like. In some cases, a contact flow may include one or more automated responses, recorded menu offerings, etc., as will be appreciated by those having skill in the art. The contact service 130 may provide any number of different contact flows to handle various customer inquiries. The contact service 210 may also provide a number of different queues, to which issues and/or action items may be assigned. A queue may be a storage location where an item or data structure is placed, typically temporarily, to be processed at a later time. The various queues may be linked or associated with one or more contact flows, such that an action item may be placed in an appropriate queue based on the action that needs to be taken to resolve or close the action. In some cases, the action to be taken may also correspond to a contact flow.

In some cases, the contact service 130 may interface with the ASR service 110 to obtain real time or near real time transcription of audio, such as an audio stream 134 between a contact center agent 104 and a customer 134. In some cases, the contact service 130 agent 104 may provide additional information top the ASR service 110 to aid in generating accurate transcripts of audio stream 134. In some cases, the contact center agent 104 and/or the customer 1323 may provide for an identification of a domain concerning the audio stream 134 to aid the ASR service 110 in generating text from audio stream 134.

In some aspects, the computing resource service provider 102 may similarly provide an ASR service 110. The ASR service 110 may be a collection of computing resources, including physical resources, virtual resources, or combinations thereof, configured to generate textual data from audio and/or video data, such as may be received as an audio stream 134, from the contact service 130, or accessed via one or more audio of video files 140, to name but a few use cases. In some cases, the ASR service 110 may interface with one or more audio control devices or services, to aid in translating speech to commands to cause various devices to perform various actions (e.g., control of smart home devices, voice activated search or other services, etc.). In this example, the output of the ASR service 110 may be a command (e.g., textual command) that is communicated to another service to cause some action to be performed.

In some cases, ASR service 110 may obtain and/or generate metadata including an identifier of a speaker or "owner" of a portion of a communication received by the ASR service 110. In some cases, the metadata may be included with the audio data. In some examples, the audio data may comprise two or more channels, each associated with a different computing device 104, 132. In this example, each channel be correlated to a different speaker or computing device. In yet other cases, other information may be used to determine which portion of the communication data belongs to a respective computing device, such as pauses, punctuation, and other characteristics of language that may be used to infer such information. In any of these examples, ASR service 110 may receive an audio stream or video stream, or collection of audio or video data (e.g., not in real time), and may convert the data to textual data, and output a document or other data object containing the textual data, such as may be stored by the data storage service 124 as transcripts 136, 138. This output may be referred to generally as a transcript, and may, in some cases, include source or speaker information and/or other metadata.

From a high level, the ASR service 110 may convert various forms of speech to textual data referred to generally as a transcript. The ASR service 110 may utilize any of a variety of techniques to convert speech to text, implemented by an ASR engine 112 in combination with an NLP component or process 120, which itself may utilize one or a multitude of neural networks 122, and other machine learning techniques. The ASR engine 112 may be a collection of computing resources that receive as input audio or video (of any of a variety of formats), and converts that audio to textual data in the form of transcripts. The ASR engine 112 may utilize any of a variety of techniques and/or processes to convert speech to text, including using various different natural language processing (NLP) 120 techniques, which may utilize various neural networks 122 for audio and speech encoding and decoding.

The ASR engine 112 may be a collection of computing resources, such as including processor capabilities and memory, that may utilize various linguistic algorithms to sort auditory signals from spoken words and transfer those signals into text using characters (e.g., Unicode). The ASR engine 112 identifies vibrations from the audio/video input and translates them into a digital language through an analog to digital converter. The analog-to-digital-converter takes sounds from an audio file, measures the waves in detail, and filters them to distinguish the relevant sounds. The sounds are then segmented into hundredths or thousandths of seconds and are then matched to one of a number of different phonemes (e.g., there are approximately 40 phenomes in the English language), which are units of sound that distinguish one word from another in any given language. The phonemes are then run through a network via one or more mathematical or other models that compares them to well-known sentences, words, and phrases, and outputs text in the form of words and sentences including, in some cases, punctuation.

The ASR service 110 may also include a knowledge graph infusion component or process 116, which may interface with the ASR engine 112 and one or more knowledge graphs 126, 128 to improve accuracy of the speech to text conversion. The knowledge graph infusion component or process 116 may be a collection of computing resources and/or a process performed by a collection of computing resources, that take as an input text, and identify at least one entity in the text. The entity may include a word or phrase, such as a noun or proper noun, that may be indicative of a topic of the text. The knowledge graph infusion process 116, using the extracted or identified one or more entities, search through one or more knowledge graphs 126, 128 to identify at least one of the entities represented in the knowledge graph as a node. The knowledge graph infusion process 116 may then identify and/or select a portion of the knowledge graph (e.g., a portion of a knowledge graph or one or more subgraphs of a given knowledge graph or graphs) that is related to the at least one identified entity. In some cases, the knowledge graph infusion process 116 may select nodes within a degree (e.g., number of connections) to the identified entity/node. In some cases, the knowledge graph infusion process 116 may use any of a variety of filters or refinement techniques to further narrow the number of nodes/entities selected/extracted from the knowledge graph. The knowledge graph infusion process 116 may then encode the set of entities to be used in a second pass decoding (e.g., fusion decoding) of the initial transcript of text to produce a final transcript of text converted from the input speech/audio/video. A more detailed example of knowledge graph infusion component 116 will be described in greater detail below in reference to FIG. 2. In addition, example processes performed by the knowledge graph infusion component 116 will be described in greater detail below in reference to FIGS. 3-6.

It should be appreciated that the ASR engine 112 and NLP 120 are only given by way of example, and that the described knowledge graph infusion component or process 116 can provide benefits and advantages to various ASR processed in converting speech to text. The described techniques may interface with any known or existing AR processes, and can be used to improve the accuracy of the speech to text conversion. The descried knowledge graph infusion techniques may utilize a transcript or any portion of text as an input, and may output a list of entities to be used in a second pass decoding to produce a finalized and more refined transcript of the original speech. In some cases, the output of the knowledge graph infusion process 116 may take the form of text embeddings, or words or phrase with additional data associated with the words or phrases, to be used in the second pass decoding of text. In some cases, the text embeddings may take any of a variety of forms, including vectors or other numerical representations that can be used by a decoder to weight selecting certain words or phrases in the decoding.

Figure 2:
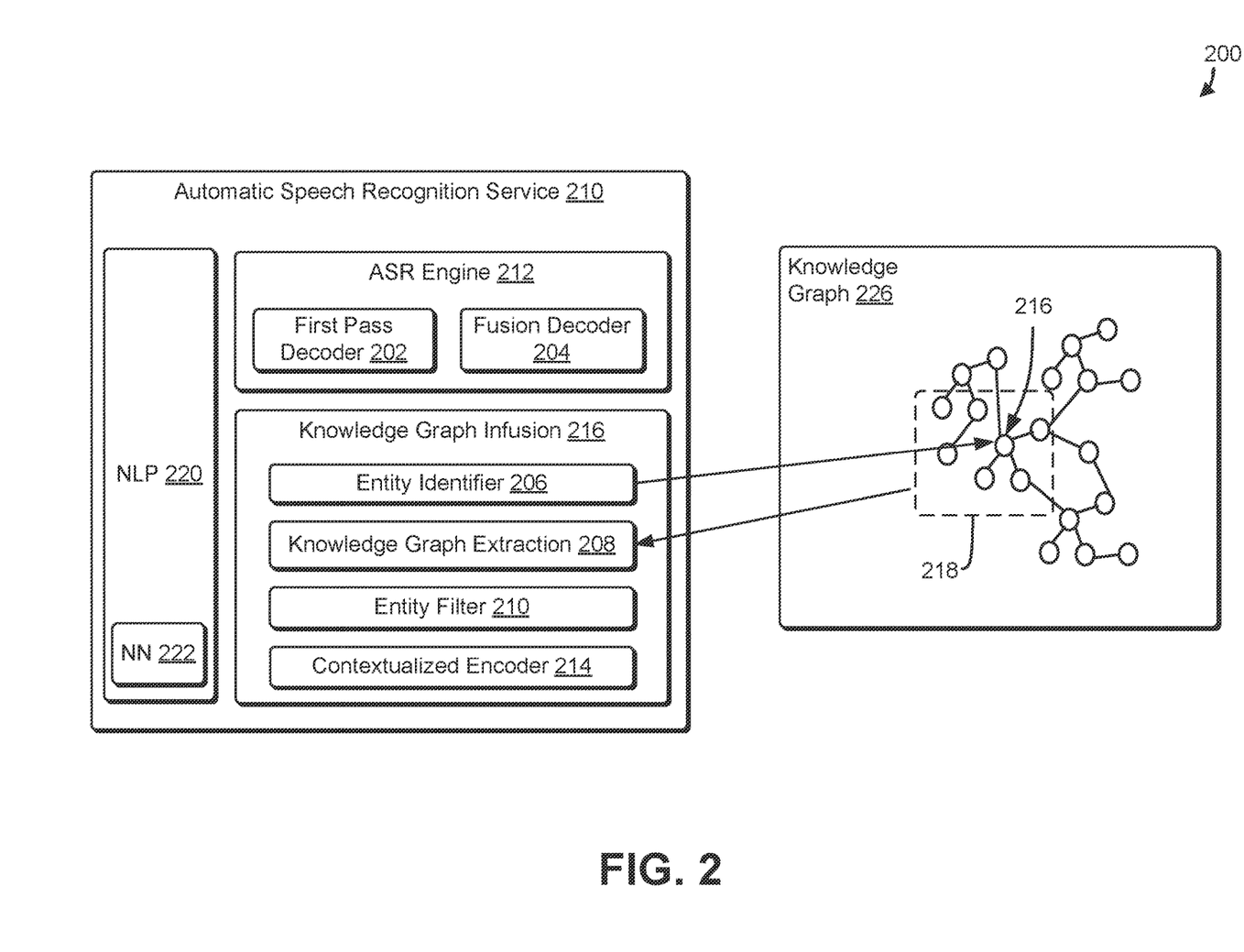
FIG. 2 illustrates an example of an automatic speech recognition service interacting with a knowledge graph, according to at least one embodiment.

FIG. 2 illustrates an example of an automatic speech recognition service 210 interacting with a knowledge graph 226. Automatic speech recognition service 210, including ASR engine 212, knowledge graph infusion component 216, NLP 220, neural network 222, and/or knowledge graph 226 may include one or more aspects of similarly named components and data structures described above in reference to FIG. 1, such that they may be more detailed examples of these components and data structures described in reference to FIG. 1.

In some cases, the ASR engine 212 may include a first pass decoder 202 and a fusion decoder 204. The first pass decoder 202 may utilize any of various text decoding techniques including various models, algorithms, etc., to output text from input audio or video data. In some cases, it may be beneficial to decrease resource usage in converting speech to text for the first pass decoder 202, such that it utilizes less accurate techniques that may be performed faster and with less computing resources. In some cases, the transcript or text (i.e., output) provided by the first pass decoder 202 may primarily be used to identify entities in a knowledge graph, such a knowledge graph 226, to then be used to inform a second pass or fusion decoder 204 to produce a final transcript of the original speech. In some examples, the first pass decoder 202 may utilize connectionist temporal classification (CTC) decoding technique, such as may be utilized with and to train recurrent neural networks (RNNs) such as LSTM networks. In some cases, the input to the first pass decoder 202 may be a transcript of the entire segment of speech to be decoded. In other cases, only a portion of the speech to be decoded may be input to the first pass decoder 202. In some cases, the portion of text input into the first pas decoder y be selected based on certain characteristic (e.g., a number of words, certain words in close proximity to one another, types of words, such as nouns, in a close proximity to one another, certain parts or relative locations of the speech/text in the whole segment to be decoded, such as a beginning 1 or 2 minute segment of audio, and/or based on various other characteristics). In some cases, the portion of speech selected as an input may be determined to be a fixed length, or may be variable from case to case based on the words decoded from the segment of speech.

In some aspects, the ASR service 110 may include a knowledge graph infusion component or process 216, which may include one or more aspects of knowledge graph infusion component 116 described above in reference to FIG. 1. The knowledge graph infusion component or process 216 may receive as an input the output of the first pass decoder 202. The knowledge graph infusion component or process 216 may include an entity identifier process that identifies one or a number of entities from the text from the first pass decoder 202. The entity identifier 206 may be trained and/or utilize one or more trained neural networks to identify various words in the text input of interest, such that it can be used to identify one or more nodes/entities of a knowledge graph, such as knowledge graph 226. In some cases, the entity identifier 206 may provide one or a list of entities identified in the text to a knowledge graph extraction component or process 208. The output of the entity identifier may be tuned or modified to output different results, such that in some cases, the entity identifier identifies all recognized nouns from the text. In other cases, the entity identifier may be trained to be more selective, such that it only produces entities that refer to a recognized place, topic, subject, etc. In some cases, the entities entity identifier 206 identifies and outputs may be from a universal set or entities, or may be from a customized set of entities or topics, etc. In some cases, when no named entities are output by the entity identifier 206, the remaining operations of the knowledge graph infusion process 216 may be skipped, such that the fusion decoder is triggered to decode the input speech without additional inputs (or in some cases, the initial transcript output from the first pass decoder 202 may be output from the ASR service 210, such as when the first pass decoder 202 and the second pass decoder utilize the same decode ng techniques, algorithms, models, etc.).

The knowledge graph infusion process 216 may also include a knowledge graph extraction component or process 208. The knowledge graph extraction process 208 may utilize the one or more entities output from the entity identifier 206 and search through one or more knowledge graphs to identify one or more nodes in the knowledge graph or graphs, such as graph 226, that correspond to the one or more entities. In some cases, the knowledge graph extraction process 208 may first use the entity list (which may include one or more entities) to determine a subset of knowledge graphs to search, such as may be associated with certain domains or topics. In some examples, the ASR service 210 may have access to a library of different knowledge graphs to utilize. In some cases, the ASR service 210 may associate certain knowledge graphs with certain topis or domains (e.g., via tags or identifiers), which can be searched by the knowledge graph extraction component 208.

As illustrated, the knowledge graph extraction component 208 may identify an entity represented by node 216 in knowledge graph 226. In some cases, upon identifying at least one node in a knowledge graph 226, the knowledge graph extraction component 208 may select a subset of nodes/entities from the knowledge graph 226 to be utilized in producing a final transcript of the original speech. In some cases, the knowledge graph extraction component 208 may select nodes in the knowledge graph 226 to be included in the subset of nodes based on a distance the nodes are from the identified node 216. In some cases, the distance metric may be measured in number of connections (e.g., hops) from the identified node, and may include 1 hop, 2 hops, 5, hops, and so on. In other cases, distance may be measured using other metrics. In yet some cases, another measurement or characteristic, other than distance, may use to select the subset of nodes. In yet some cases, a maximum number may be placed on the subset of nodes, such as to reduce computational complexity for additional processes carried out by the ASR service 210. In yet some cases, the number of hops utilized to select a subset of nodes/entities for a given entity identified by entity identifier 206 may be determined based on the number of entities produced by the entity identifier 206 in the first instance. In this example, the number of hops may be selected/balanced against the number of entities, such that more hops will be utilized to a select the subset of nodes for a smaller number of identified entities, and a smaller number of hops will be utilized for a larger initial list of entities to search.

In any of the above examples, the knowledge graph extraction component 208 may output one or a number of different sets or subsets of entities (collectively referred to as set of named entities). In some optional cases, the knowledge graph infusion process 216 may also include an entity filer 210. The entity filer 210 may be a component or process that runs the set of named entities extracted from the knowledge graph(s) through one or more filters to produce a reduced set or subset of entities based on any of a variety of filtering techniques. In some cases, the entity filter 210 may utilize one or a number of different algorithms, machine learning processes, etc., to select and/or reduce the set of named entities based on a variety of factors. In some cases, the entity filter 210 may utilize a fuzzy refinement algorithm to reduce the set of named entities for input into an encoder, which may be a contextualized encoder 214.

In some cases, the knowledge graph infusion process 216 may also include contextualized encoder 214. The contextualized encoder 214 may be a component or process that embeds or associates one or more values with the subset of named entities output by the entity filter 210 (or of the set of named entities output by the knowledge graph extraction process 208 in the case that no entity filter 210 is implemented or used), such as may be used to incorporate the set or subset of named entities into a second pass or fusion decoder 204, to improve the accuracy of the ultimate speech to text result.

In some cases, the ASR engine 212 may also include a fusion decoder 204, which may utilize the same or different decoding methods as the first pass decoder 202. In some cases, the fusion decoder 204 may take as inputs the segment of speech to be decoded and one or more outputs from the knowledge graph infusion process or component 216 (e.g., in the form or word or text embeddings).

Figure 3:
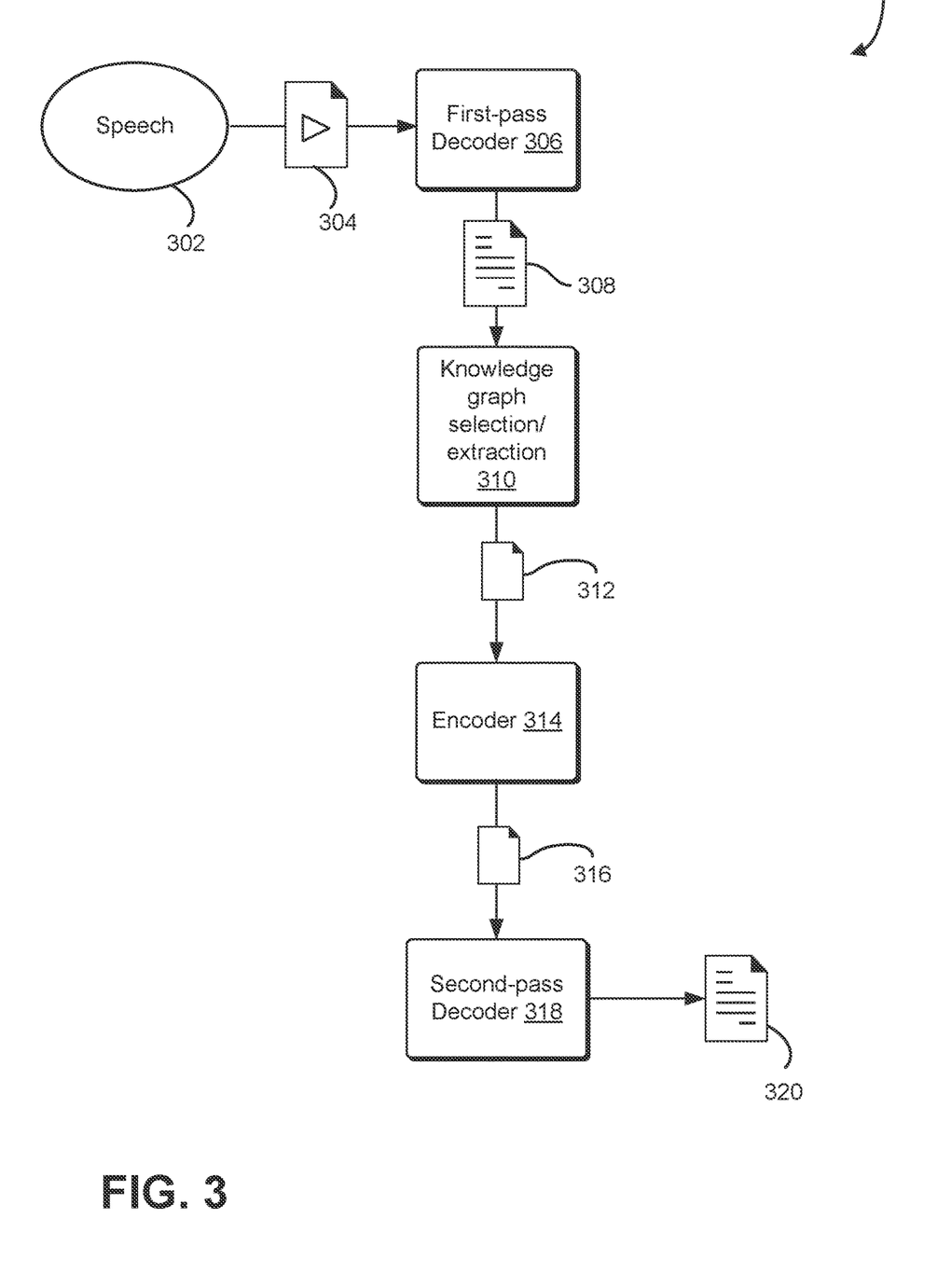
FIG. 3 illustrates an example process for using a knowledge graph in converting speech to text speech, according to at least one embodiment.

FIG. 3 illustrates an example process 300 for using a knowledge graph in transcribing speech. In some examples, process 300 may be performed by the ASR service 110, 210 described above in reference to FIGS. 1 and 2, and/or by various components of the ASR service, including the ASR engine 112, 212, first pass decoder 202, fusion decoder 204, knowledge graph infusion process 116, 216, entity indenter 206, knowledge graph extraction process 208, entity filter 210, and/or contextualized encoder 214.

Process 300 may begin by receiving a recording or stream 304 of speech 302, such as by an ASR service. The recording or stream 304 may take any of a variety of formats, including various audio file formats, video file formats, or streaming audio or video. The audio/video recording or stream 304 may be processed by a first pass decoder 306, which may output a transcript 308 (either full or partial, as described above), of the audio/video file or stream 304. The knowledge graph selection/extraction component or process 310 may identify one or a number of entities in the transcript 308 and find corresponding nodes in one or more knowledge graphs that correspond to the one or more entities. The knowledge graph selection/extraction component or process 310 may then output a set of entities 312 corresponding to nodes in the identified knowledge graph or graphs. An encoder 314 may receive the entities 312 and modify/encode the entities to produce an set of word of phrase embeddings (e.g., entity embeddings) 316, which may include additional information about one or more of the words or phrases (e.g., how likely they are to occur, how they are related to other words or phrases such that the occurrence of another word or phrase would make the occurrence of the given word of phrase more likely, and so on). In some cases, the entity embeddings 316 may include a mathematical representation (e.g., vector representation) of one or more characteristics of the word of phrase, such as may be used by an encoder to determine, with a higher degree of certainty, if a certain word or phrase is likely to be used in proximity to other words or phrases. The vector representation may represent any of a variety of different factors such as may account for likelihood that a given word or phrase is used. The word or entity embeddings 316 may be obtained by a second pass or fusion decoder 318, which may use the entity embeddings 316 to help generate a final transcript 320 of the speech 302.

Figure 4:
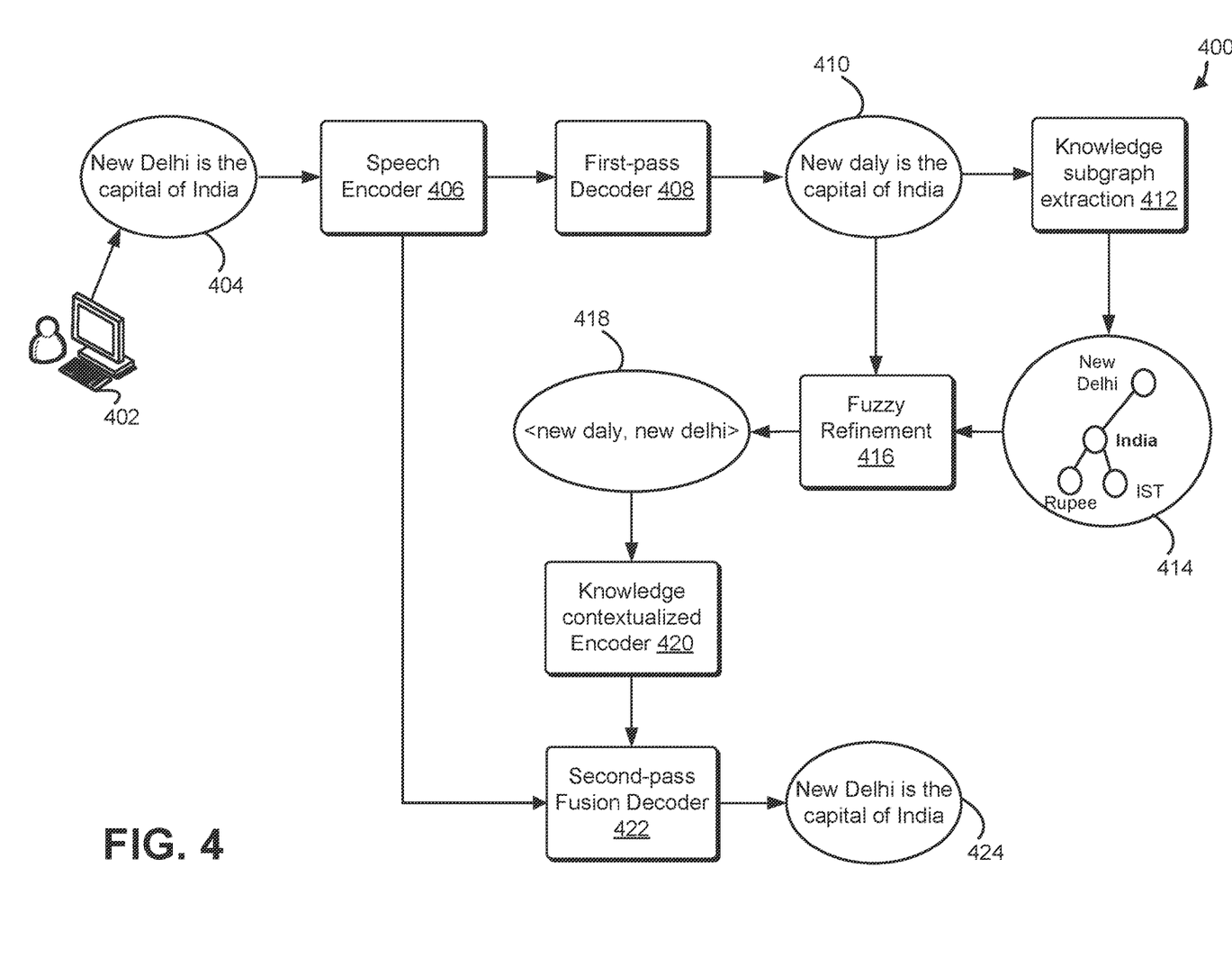
FIG. 4 illustrates another example process for using a knowledge graph in converting speech to text speech, according to at least one embodiment.

FIG. 4 illustrates another example process 300 for using a knowledge graph in transcribing speech. In some examples, process 400 may be performed by the ASR service 110, 210 described above in reference to FIGS. 1 and 2, and/or by various components of the ASR service, including the ASR engine 112, 212, first pass decoder 202, fusion decoder 204, knowledge graph infusion process 116, 216, entity indenter 206, knowledge graph extraction process 208, entity filter 210, and/or contextualized encoder 214.

As illustrated in FIG. 4, speech 404, which states "New Delhi is the capital of India" is received by a computing device 402. The speech 404 may be passed to a speech encoder 406, which may process the speech such as using various types of compression using one or more speech codecs to produce a digital audio signal. The digital audio signal may be first passed to a first pass decoder 408, which may convert a digital representation of the speech 404 to text 41. In the example illustrated, first pass decoder may output the sentence "New daly is the capital of India." In some cases, first pass decoder 408 may output an initial transcription that provides a preliminary context of the input speech. First pass decoder 408 may utilize various decoding methodology, such as CTC decoding, to reduce the first-pass overhead of this initial stage of inference.

The output text/transcription 410 may be passed to a knowledge subgraph extraction process 412, in which candidate named entities may be extracted from the first-pass transcription 410 by performing named entity recognition. The knowledge subgraph extraction process 412 may yield entities already recognized in the speech. Using the named entities, a portion of a knowledge graph 414 (e.g., a subgraph) may be identified, such as from a library of knowledge graphs, or from publicly accessible knowledge graphs, etc. A subset of nodes of the subgraph 414 may be identified and selected. The subset may, in the example illustrated, include nodes that within one-hop of the recognized entities. In this example, New Delphi may be within one hop from India.

In some cases, the knowledge subgraph may contain a large number of entities, especially for high degree nodes. In these cases, the subgraph may be filtered, such as by performing fuzzy refinement, at operation 416, which matches n-grams from the first-pass decoding with surface forms of entities from the subgraph using a fuzzy matching algorithm. In some cases, only the surface forms that have a fuzzy matching score with an n-gram above some specified threshold may be retained. The fuzzy refinement operation 416 may output a reduced list of named entities, such as named entities 418, which include "new daly, new delhi." The reduced set of named entities 418 may then be encoded, such as using a knowledge-contextualized encoder 420, that is trained using any of a variety of well-known knowledge graph embedding methods. In some cases, while training the embeddings, lexical information of the entities' surface forms may also be incorporated by using an intermediate sequence encoder that encodes the surface form subwords. Hence, the entity embeddings produced by the encoder 420 may encode lexical as well knowledge-contextualized semantics.

Next, the entity embeddings from encoder 420 may be used by a second pass fusion decoder 422, which may combine the encoded speech from the speech encoder 406 and the knowledge-contextualized embeddings of the candidate named entities for decoding the final transcription 424, which may include the following sentence "New Delhi is the capital of India." In some cases, an early-stage fusion technique may be utilized by decoder 422 to combine the multi-modal embeddings for decoding.

Figure 5:
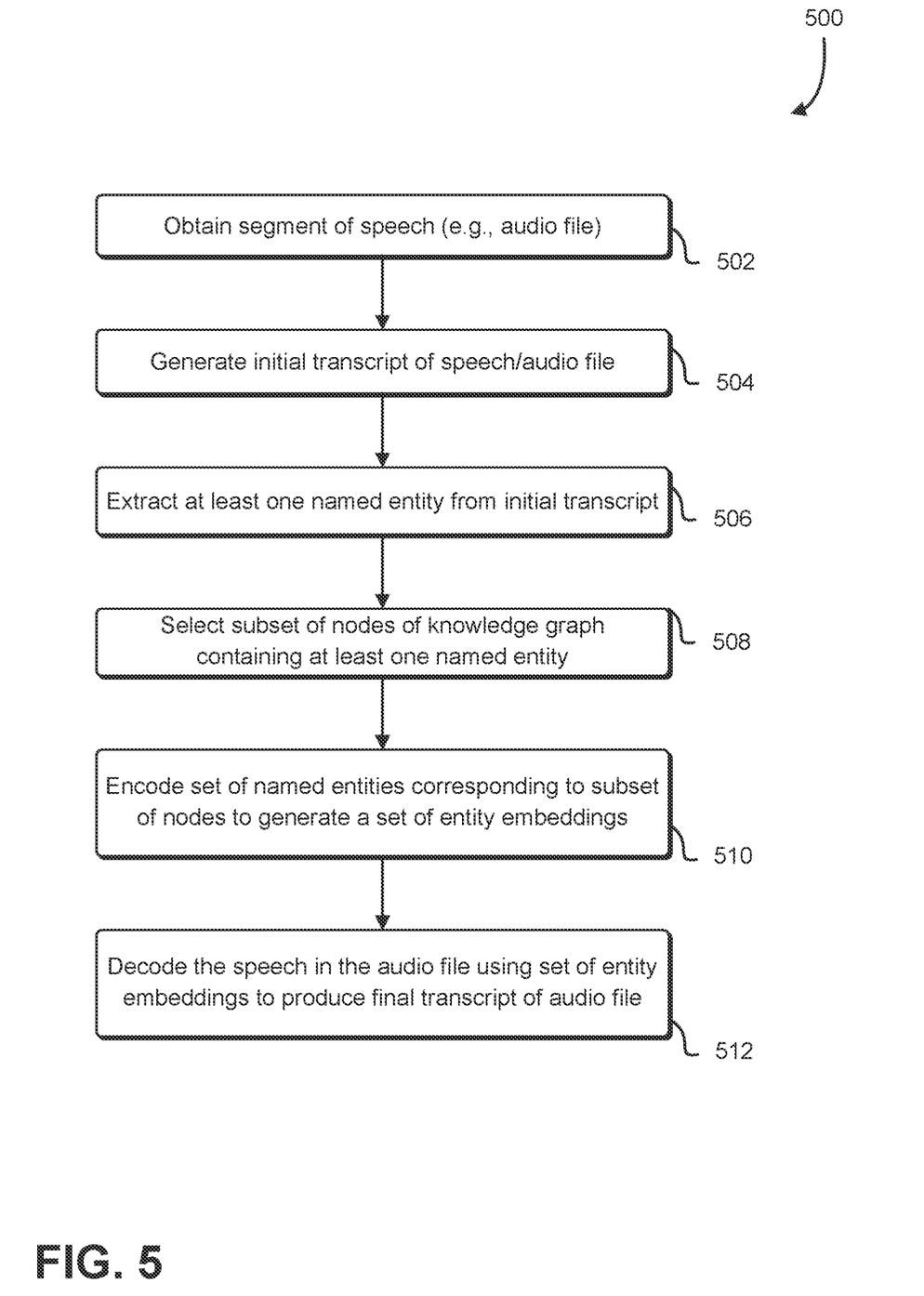
FIG. 5 illustrates an example process for using a knowledge graph in transcribing speech, according to at least one embodiment.

FIG. 5 illustrates an example 500 process for using a knowledge graph in converting speech to text speech. In some examples, process 500 may be performed by the ASR service 110, 210 described above in reference to FIGS. 1 and 2, and/or by various components of the ASR service, including the ASR engine 112, 212, first pass decoder 202, fusion decoder 204, knowledge graph infusion process 116, 216, entity indenter 206, knowledge graph extraction process 208, entity filter 210, and/or contextualized encoder 214. In some cases, process 500 may incorporate one or more aspects of operations of processes 300 and/or 400 described above in reference to FIGS. 3 and 4.

Process 500 may begin at operation 502, in which a segment of speech may be obtained, such as by an ASR service. The segment of speech may be a digital representation of speech, such as may be included in an audio or video stream, or an audio or video file. Next, an initial transcript of the speech may be generated at operation 504. In some cases, operation 504 may be performed by a first pass encoder, and/or may utilize various decoding techniques, such as CTC or other known techniques. At least one named entity may then be extracted from the initial transcript, at operation 506. In some cases, the at least one entity may be extracted by an entity identifier 206 or a knowledge graph infusion process 116, 216 more generally, as described above in reference to FIGS. 1 and 2, using named entity recognition. In some cases, the named entity recognition may not need an exact match, such that one or more various thresholds are used to positively identify a named entity form the transcript. The one or more thresholds may be based on same or similar characters, similar sounding words or phrase, or words that are similar and are related to other words nearby in the transcript (e.g., New Delph to India).

In some cases, operation 506 may identify one or more named entities that are close to, but do not match exactly, a word or phrase in the initial transcript. In this case, the additional identified name entities or entities may be added to the set of named entities that are actually identified in the initial transcript, for example, when the additional named entity matches a word or phrase in the initial transcript to a certain degree (e.g., satisfying a closeness threshold, which may be based on a number of same characters, similar phonetics, and the like, and or may be related to other words in the phrase or sentence). In these cases, operation 506 may further include identifying at least one second named entity by performing named entity recognition on the initial transcript, wherein selecting the subset of nodes of the knowledge graph further comprises selecting the subset of nodes of the knowledge graph to further include the at least one second named entity.

At operation 508, a subset of nodes of a knowledge graph that include the at least one named entity may be selected. In some cases, the subset of nodes may correspond to a set of named entities, where the knowledge graph includes a plurality of nodes indicating a plurality of named entities including the at least one named entity, where at least some of the plurality of nodes are connected by edges indicating relationships between the respective plurality of nodes. In some cases, operation 508 may also include filtering the subset of nodes to generate a filtered subset of nodes, wherein the filtered subset of nodes corresponds to the set of named entities. In yet some cases, the filtering may include associating a score to the subset of nodes based on a degree to which individual nodes correspond to a named entity of the set of named entities; and removing nodes from the subset of nodes associated with a score below a threshold value. In some specific examples, the filtering may include using one or more fuzzy matching techniques or algorithms, as are known in the art. In some examples, operation 508 may include selecting nodes that are within a threshold distance from the at least one named entity. In some cases, process 500 may also include obtaining an indication of a domain associated with the audio file and selecting a domain specific knowledge graph based on the indication of the domain.

At operation 510 the set of named entities may be encoded to generate a set of entity embeddings. In some cases, operation 510 may be performed by a knowledge contextualized encoder, as described in greater detail above. In yet some cases, operation 510 may be performed using at least one of a knowledge-contextualized encoder and sequence encoder using lexical information. In some cases, the entity embedding each may include a vector representation associated with the entity.

At operation 512, the speech included in the audio/video file may be decoded using the set of entity embeddings to produce a final transcript of the audio file. In some cases, operation 512 may include using a fusion decoder to incorporate the entity embeddings into the final transcript.

Figure 6:
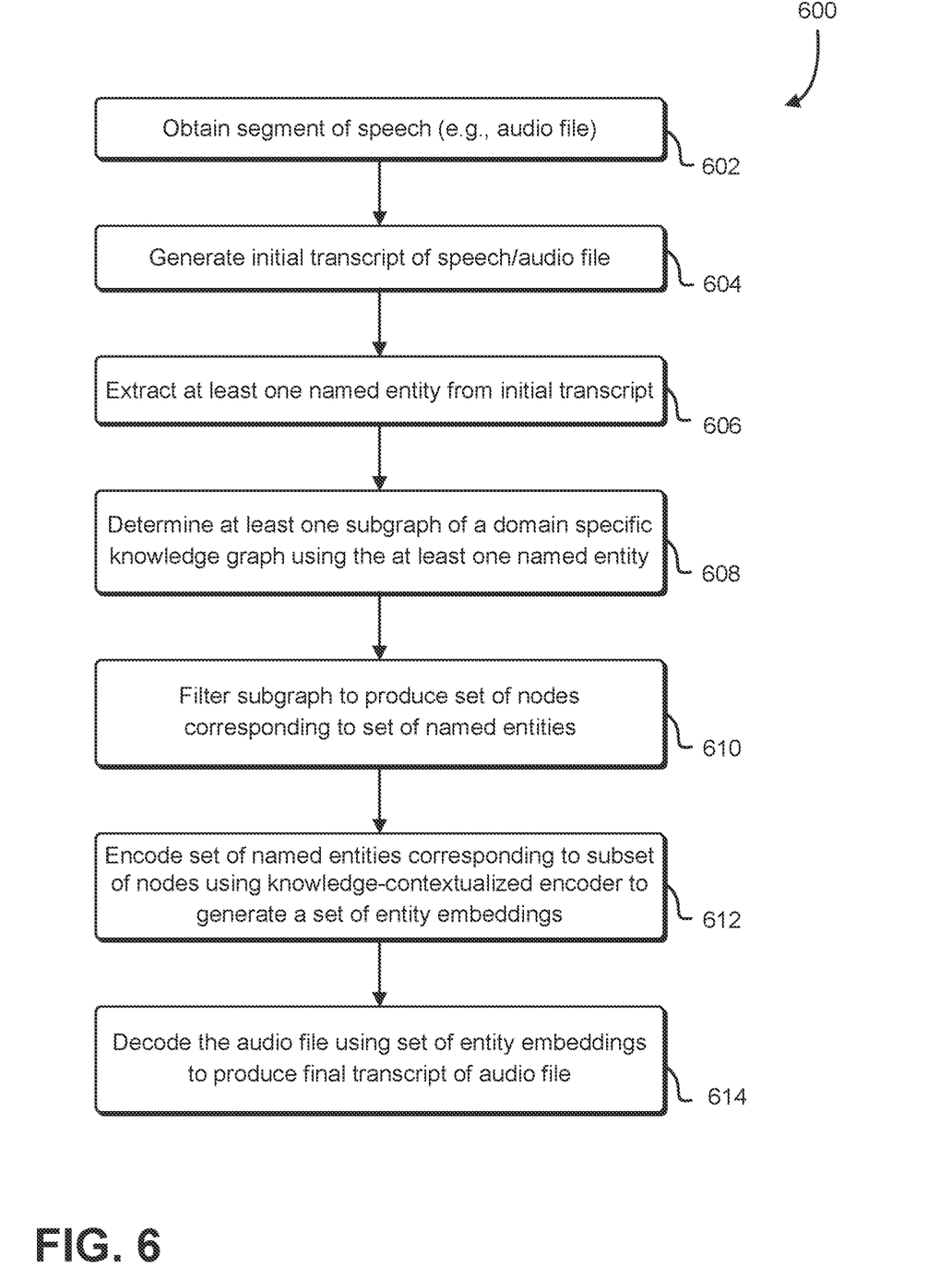
FIG. 6 illustrates another example process for using a knowledge graph in transcribing speech, according to at least one embodiment.

FIG. 6 illustrates an example 600 process for using a knowledge graph in converting speech to text speech. In some examples, process 600 may be performed by the ASR service 110, 210 described above in reference to FIGS. 1 and 2, and/or by various components of the ASR service, including the ASR engine 112, 212, first pass decoder 202, fusion decoder 204, knowledge graph infusion process 116, 216, entity indenter 206, knowledge graph extraction process 208, entity filter 210, and/or contextualized encoder 214. In some cases, process 600 may incorporate one or more aspects of operations of processes 300, 400, and/or 500 described above in reference to FIGS. 3, 4, and 5.

Process 600 may begin at operation 602, in which a segment of speech may be obtained, such as by an ASR service. An initial transcript of the speech may be generated at operation 604. In some cases, operation 604 may be performed by a first pass encoder, and/or may utilize various decoding techniques, such as CTC or other known techniques. At least one named entity may then be extracted from the initial transcript, at operation 606. At operation 608, a subset of nodes or subgraph of a domain-specific knowledge graph that include the at least one named entity may be selected. In some cases, such as where two or more named entities identified in the initial transcript are not related, a subgraph of two different domain specific knowledge graphs may be selected, each corresponding to a domain of the different named entities. In some examples, operation 608 may include selecting nodes that are within a threshold distance from the at least one named entity.

Next, at operation 610, the one or more sets of nodes/named entities from the one or more subgraphs may be filtered. In some cases, the filtering may include associating a score to the subset of nodes based on a degree to which individual nodes correspond to a named entity of the set of named entities; and removing nodes from the subset of nodes associated with a score below a threshold value. In some specific examples, the filtering may include using one or more fuzzy matching techniques or algorithms.

At operation 612, the set of named entities may be encoded to generate a set of entity embeddings. In some cases, operation 612 may be performed by a knowledge contextualized encoder, a sequence or lexical encoder, or a combination thereof. In some cases, the entity embedding each may include a vector representation associated with the entity. At operation 612, the speech included in the audio/video file may be decoded using the set of entity embeddings to produce a final transcript of the audio file. In some cases, operation 612 may include using a fusion decoder to incorporate the entity embeddings into the final transcript.

Figure 7:
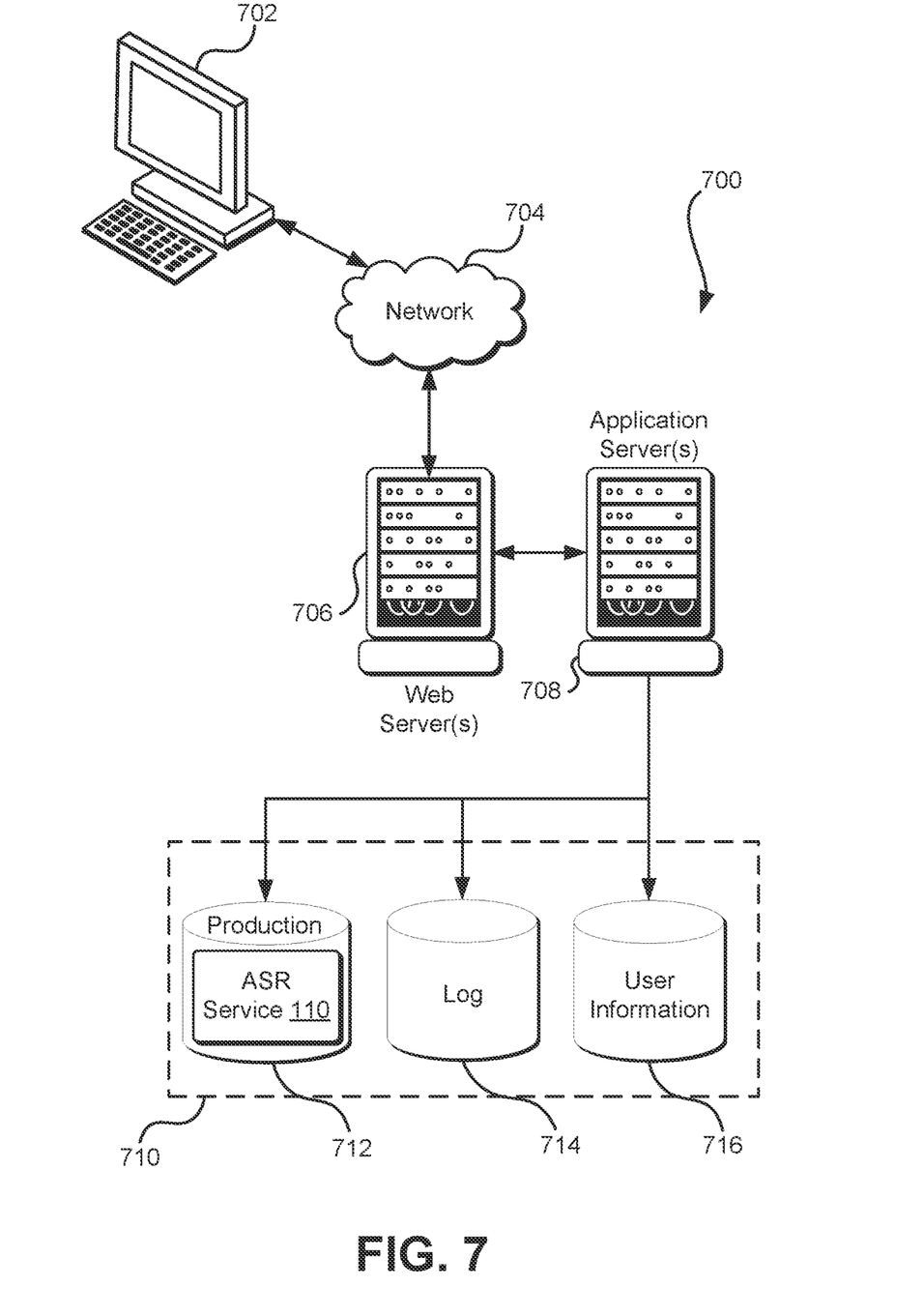
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PUP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. In some aspects, the production data 712 may include or provide the ASR service 110, 210 as described above in reference to FIGS. 1 and 2. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PUP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   at least one processor; and
   memory that stores computer-executable instructions that, as a result of being executed by the one or more processors, cause the system to:
   responsive to receiving a request to perform automated speech recognition (ASR) on an audio file by the system, generate an initial transcript of the audio file by decoding the audio file;
   extract at least one named entity from the initial transcript by performing named entity recognition;
   select at least one subgraph of a domain specific knowledge graph using the at least one named entity, the at least one subgraph comprising a subset of the domain specific knowledge graph, the domain specific knowledge graph comprising a plurality of nodes indicating a plurality of named entities relating to customer interactions with a contact service and including the at least one named entity, where at least some of the plurality of nodes are connected by edges indicating relationships between the respective plurality of nodes;
   filter the subgraph to produce a set of nodes, the set of nodes corresponding to a set of named entities, wherein nodes of the subgraph that have a matching score of greater than a threshold are retained to produce the set of named entities;
   encode the set of named entities using a knowledge contextualized encoder to generate a set of entity embeddings; and
   decode the audio file using the set of entity embeddings to produce a final transcript of the audio file.

2. The system of claim 1, wherein the computer-executable instructions further comprise instructions that, as a result of being executed by the one or more processors, further cause the system to:
   generate the set of entity embeddings using lexical information.

3. The system of claim 1, wherein the computer-executable instructions that cause the system to filter the subgraph to produce the set of nodes further comprise instructions that, as a result of being executed by the one or more processors, further cause the system to:
   use a fuzzy refinement algorithm to determine whether the nodes have a matching score greater than a threshold.

4. The system of claim 1, wherein the computer-executable instructions further comprise instructions that, as a result of being executed by the one or more processors, further cause the system to:
   decode the audio file using a Connectionist Temporal Classification (CTC) trained neural network to generate the initial transcript.

5. A method for converting speech to text, comprising:
   generating an initial transcript of an audio file comprising speech;
   extracting at least one named entity from the initial transcript by performing named entity recognition;
   selecting a subset of nodes of a domain-specific knowledge graph that include the at least one named entity, the subset of nodes comprising a subgraph of the domain specific knowledge graph and corresponding to a set of named entities, the domain-specific knowledge graph comprising a plurality of nodes indicating a plurality of named entities relating to customer interactions with a contact service and including the at least one named entity, where at least some of the plurality of nodes are connected by edges indicating relationships between the respective plurality of nodes, wherein the selecting comprises retaining nodes of the subgraph that have a matching score of greater than a threshold value to produce the set of named entities;
   encoding the set of named entities to generate a set of entity embeddings; and
   decoding the speech in the audio file using the set of entity embeddings to produce a final transcript of the audio file.

6. The method of claim 5, wherein selecting the subset of nodes further comprises:
associating a matching score to the subset of nodes based on a degree to which individual nodes correspond to a named entity of the set of named entities; and
removing nodes from the subset of nodes associated with a matching score below the threshold value.

7. The method of claim 5, wherein selecting the subset of nodes further comprises using fuzzy matching.

8. The method of claim 5, wherein selecting the subset of nodes of the domain-specific knowledge graph that include the at least one named entity further comprises selecting nodes that are within a threshold distance from the at least one named entity.

9. The method of claim 5, wherein encoding the set of named entities to generate the set of entity embeddings is performed using at least one of a knowledge-contextualized encoder and sequence encoder using lexical information.

10. The method of claim 5, wherein the domain-specific knowledge graph is selected based on the initial transcript.

11. The method of claim 5, further comprising identifying at least one second named entity by performing named entity recognition on the initial transcript, wherein selecting the subset of nodes of the domain-specific knowledge graph further comprises selecting the subset of nodes of the domain-specific knowledge graph to further include the at least one second named entity.

12. A non-transitory computer-readable storage medium storing thereon executable instructions that, as a result of being executed by one or more processors of a computer system, cause the computer system to at least:
generate an initial transcript of speech;
extract at least one named entity from the initial transcript by performing named entity recognition;
select at least a subset of nodes of a domain-specific knowledge graph that include the at least one named entity, the subset of nodes comprising a subgraph of the domain-specific knowledge graph and corresponding to a set of named entities, the domain-specific knowledge graph comprising a plurality of nodes indicating a plurality of named entities relating to interactions with a contact service and including the at least one named entity, where at least some of the plurality of nodes are connected by edges indicating relationships between the respective plurality of nodes, wherein the selecting comprises retaining nodes of the subgraph that have a matching score of greater than a threshold value to produce the set of named entities;
encode the set of named entities using a knowledge contextualized encoder to generate a set of entity embeddings; and
decode the initial transcript using the set of entity embeddings to produce a final transcript of the speech.

13. The non-transitory computer-readable storage medium of claim 12, wherein the instructions that cause the computer system to select at least the subset of nodes further comprise instructions that, as a result of being executed by the one or more processors, cause the computer system to:
associate a matching score to the subset of nodes based on a degree to which individual nodes correspond to a named entity of the set of named entities; and
retain nodes in the subset of nodes associated with a matching score above a threshold value.

14. The non-transitory computer-readable storage medium of claim 12, wherein the instructions further comprise instructions that, as a result of being executed by the one or more processors, cause the computer system to:
select at least the subset of nodes using a fuzzy matching algorithm.

15. The non-transitory computer-readable storage medium of claim 12, wherein the instructions that cause the computer system to select at least the subset of nodes of the domain-specific knowledge graph further comprise instructions that, as a result of being executed by the one or more processors, cause the computer system to:
select nodes of the domain-specific knowledge graph that are within a threshold distance from the at least one named entity.

16. The non-transitory computer-readable storage medium of claim 15, wherein the instructions further comprise instructions that, as a result of being executed by the one or more processors, cause the computer system to:
obtain an indication of a domain associated with the speech; and
select the domain specific knowledge graph based on the indication of the domain.

17. The non-transitory computer-readable storage medium of claim 12,
wherein the instructions further comprise instructions that, as a result of being executed by the one or more processors, cause the computer system to:
generate the set of entity embeddings using an lexical encoder.

18. The non-transitory computer-readable storage medium of claim 12, wherein the entity embedding each comprises a vector representation of the entity.

* * * * *